US009772006B2

(12) United States Patent
Kim et al.

(10) Patent No.: US 9,772,006 B2
(45) Date of Patent: Sep. 26, 2017

(54) DOUBLE CLUTCH TRANSMISSION

(71) Applicant: Hyundai Powertech Co., Ltd., Chungcheongnam-do (KR)

(72) Inventors: Cheol Jin Kim, Gyeonggi-do (KR); Yeon-Tae Lee, Gyeonggi-do (KR)

(73) Assignee: HYUNDAI POWERTECH CO., LTD., Chungcheongnam-Do (KR)

( * ) Notice: Subject to any disclaimer, the term of this patent is extended or adjusted under 35 U.S.C. 154(b) by 76 days.

(21) Appl. No.: 14/439,539

(22) PCT Filed: Feb. 18, 2013

(86) PCT No.: PCT/KR2013/001242
§ 371 (c)(1),
(2) Date: Apr. 29, 2015

(87) PCT Pub. No.: WO2014/069720
PCT Pub. Date: May 8, 2014

(65) Prior Publication Data
US 2015/0285340 A1    Oct. 8, 2015

(30) Foreign Application Priority Data

Oct. 31, 2012    (KR) .......................... 10-2012-0122110

(51) Int. Cl.
*F16H 3/08*     (2006.01)
*F16H 3/00*     (2006.01)
*F16H 3/093*    (2006.01)

(52) U.S. Cl.
CPC ............. *F16H 3/006* (2013.01); *F16H 3/093* (2013.01); *F16H 2003/0931* (2013.01); *F16H 2200/006* (2013.01); *Y10T 74/19228* (2015.01)

(58) Field of Classification Search
CPC .. F16H 3/006; F16H 2003/0931; F16H 3/091; F16H 47/02

(Continued)

(56) References Cited

U.S. PATENT DOCUMENTS 6,209,407 B1 *  4/2001  Heinzel ................... F16H 3/006
                                                          74/331
6,755,089 B2 *  6/2004  Hirt ......................... F16H 3/006
                                                          74/329

(Continued)

FOREIGN PATENT DOCUMENTS

CN    101975252 A    2/2011
CN    102865337 A    1/2013

(Continued)

OTHER PUBLICATIONS

International Search Report in International Application No. PCT/KR2013/001242, filed Feb. 18, 2013.

(Continued)

*Primary Examiner* — Ha D Ho
(74) *Attorney, Agent, or Firm* — Saliwanchik, Lloyd & Eisenschenk

(57) ABSTRACT

A double clutch transmission (DCT) provides eight forward speeds and one reverse speed while minimizing the number of gear trains used for changing speed and the whole length thereof. In particular, the DCT has a simple structure using four or five gear trains and four synchro devices and is capable of providing eight forward speeds and one reverse speed while reducing the entire weight thereof. In a conventional DCT, when a gear train is added to increase the number of speed stages, the whole length thereof is increased. The provided DCT can minimize the whole length and the weight thereof, thereby reducing the manufacturing cost, the number of parts, and the fuel efficiency.

2 Claims, 2 Drawing Sheets

(58) Field of Classification Search
 USPC .................................. 74/330, 331, 333, 340
 See application file for complete search history.

(56) References Cited

U.S. PATENT DOCUMENTS

| | | | |
|---|---|---|---|
| 7,287,442 B2 * | 10/2007 | Gumpoltsberger | .... B60K 17/08 74/331 |
| 8,166,842 B2 | 5/2012 | Rieger | |
| 2003/0121343 A1 * | 7/2003 | Berger | .................... F16H 61/28 74/340 |
| 2010/0269611 A1 * | 10/2010 | Rieger | .................... F16H 3/006 74/331 |

FOREIGN PATENT DOCUMENTS

| | | |
|---|---|---|
| DE | 10347273 A1 | 4/2004 |
| DE | 102008050964 A1 | 4/2010 |
| JP | 2008-069832 A | 3/2008 |
| JP | 2010-209951 A | 9/2010 |
| KR | 10-0897264 B1 | 5/2009 |
| KR | 10-2011-0067282 A | 6/2011 |

OTHER PUBLICATIONS

Office Action dated Oct. 9, 2016 in Chinese Application No. 201380056805.1.
Office Action dated Jan. 20, 2017 in German Application No. 112013005196.6.

* cited by examiner

DOUBLE CLUTCH TRANSMISSION

CROSS-REFERENCE TO RELATED APPLICATIONS

This application is the U.S. national stage application of International Patent Application No. PCT/KR2013/001242, filed Feb. 18, 2013, which claims priority to Korean Application No. 10-2012-0122110, filed Oct. 31, 2012, the disclosures of each of which are incorporated herein by reference in their entirety.

TECHNICAL FIELD

The present invention relates to a double clutch transmission (DCT), and more particularly, to the structure of a DCT which is capable of implementing a plurality of speed stages using a minimum number of gear trains, thereby providing eight forward speeds and one reverse speed while minimizing the whole length thereof.

BACKGROUND ART

Recently, various attempts have been made to develop a new transmission system for increasing fuel efficiency. Among the attempts, a double clutch transmission (DCT) has received attention as a new transmission system. Currently, since the DCT exhibits excellent fuel efficiency and power conversion performance, the DCT is applied to various types of vehicles.

Since the DCT has a structure in which input shafts (hollow shafts) for transmitting power are placed in parallel, the transmission structure can be reduced in length. In particular, since speed change is performed through two clutches, the DCT has excellent speed change efficiency. That is, an input shaft for transmitting power of an engine is separated into two shafts, an odd gear is arranged on one shaft, and an even gear is arranged on the other shaft. Then, the two clutches are alternately operated to change speed.

As the number of speed stages increases, a transmission applied to a vehicle as well as the DCT can not only smoothly change speed, but also improve fuel efficiency. Thus, much research has been conducted to increase the number of speed stages.

In order to increase the number of speed stages, gear trains must be added for a desired speed stage. In this case, however, the whole length as well as the entire weight of the transmission is inevitably increased.

Thus, there is a demand for a transmission which is capable of increasing the number of speed stages through a simple structure without increasing the entire weight of the transmission.

DISCLOSURE

Technical Problem

Embodiments of the present invention are directed to a double clutch transmission (DCT) which is capable of providing eight forward speeds and one reverse speed while minimizing the number of gear trains used for changing speed and the whole length of the DCT.

Also, embodiments of the present invention are directed to a DCT which has a simple structure using four or five gear trains and four synchro devices and is capable of providing eight forward speeds and one reverse speed while reducing the entire weight of the DCT.

Technical Solution

In a first embodiment of the present invention, a double clutch transmission (DCT) which provides eight forward speeds and one reverse speed may include: first and second input shafts selectively receiving power from an engine through clutches, respectively; an output shaft including first and second output shafts which receive power from the first and second input shafts, respectively, and output the received power; first and second gear trains mounted on the first input shaft and selectively transmitting power to the output shaft; third and fourth gear trains mounted on the second input shaft and selectively transmitting power to the output shaft; a first synchro device installed on the first output shaft so as to be positioned between the first and second gear trains and synchronizing the first and second gear trains to selectively transmit power, and a third synchro device installed on the first output shaft so as to be positioned between the third and fourth gear trains and synchronizing the third and fourth gear trains to selectively transmit power; a second synchro device installed on the second output shaft so as to be positioned between the first and second gear trains and synchronizing the first and second gear trains to selectively transmit power, and a fourth synchro device installed on the second output shaft so as to be positioned between the third and fourth gear trains and synchronizing the third and fourth gear trains to selectively transmit power; and an output gear installed on the output shaft and transmitting an output thereof to a differential device.

In a second embodiment of the present invention, a DCT has the same structure as the first embodiment, but the fourth gear train may include a fifth gear train so as to operate as dual gear trains.

The first and second input shafts may be provided in the form of dual pipes using hollow shafts and arranged on the coaxial line.

The first to fourth gear trains may include external gears.

The clutches and the synchro devices may be operated according to Table 1 below.

TABLE 1

|  | Clutch | | Synchro devices | | | | | | | |
|---|---|---|---|---|---|---|---|---|---|---|
|  | | | First synchro | | Second synchro | | Third synchro | | Fourth synchro | |
|  | C1 | C2 | First train | Second train | First train | Second train | Third train | Fourth train | Third train | Fourth train |
| R |  | ○ |  |  |  |  |  | • |  | • |
| N |  |  |  |  |  | (•) |  |  |  | • |
| 1 | ○ |  |  |  |  | • |  |  |  | • |

TABLE 1-continued

| | Clutch | | Synchro devices | | | | | | |
|---|---|---|---|---|---|---|---|---|---|
| | | | First synchro | | Second synchro | | Third synchro | | Fourth synchro |
| | C1 | C2 | First train | Second train | First train | Second train | Third train | Fourth train | Third train | Fourth train |
| 2 |   | o |   |   |   |   |   |   |   | • |
| 3 | o |   |   |   | • |   |   |   |   |   |
| 4 |   | o |   |   |   |   |   | • |   |   |
| 5 | o |   | • |   |   |   |   |   |   |   |
| 6 |   | o |   |   |   |   |   |   | • |   |
| 7 | o |   |   |   | • |   | • |   |   |   |
| 8 |   | o | • |   |   | • |   |   |   |   |

(•) represents selectively restricting or releasing synchro device

Advantageous Effects

The DCT in accordance with the embodiment of the present invention has the following effects.

(1) In a conventional DCT, when a gear train is added to increase the number of speed stages, the whole length thereof is increased. The DCT in accordance with the embodiment of the present invention can provide eight forward speeds and one reverse speed using four or five gear trains, without increasing the whole length thereof.

(2) Therefore, the DCT can minimize the whole length and the weight thereof, thereby reducing the manufacturing cost, the number of parts, and the fuel efficiency.

DESCRIPTION OF DRAWINGS

The above and other aspects, features and advantages of the invention will become apparent from the following detailed description in conjunction with the accompanying drawings, in which.

BEST MODE

Figure 1:
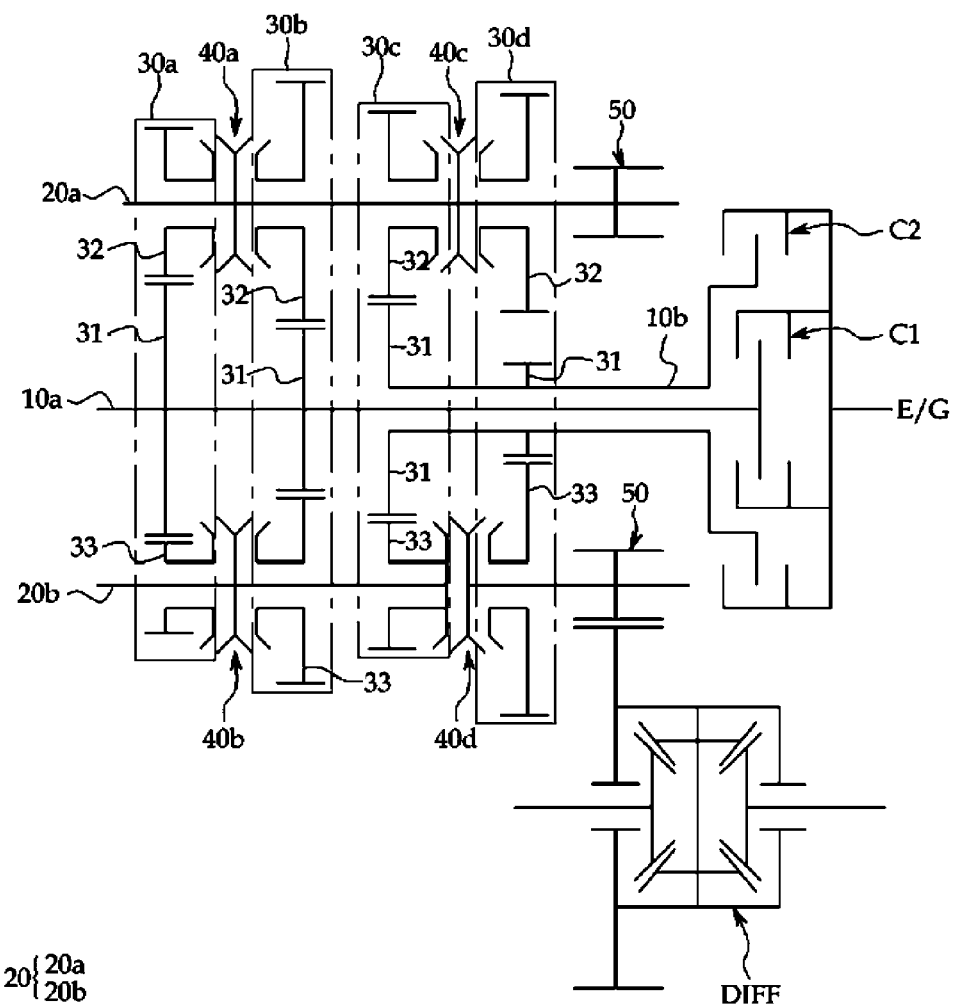
FIG. 1 schematically illustrates an example in which a DCT in accordance with a first embodiment of the present invention is applied.

Embodiments of the invention will hereinafter be described in detail with reference to the accompanying drawings. The terms used in this specification and claims must not be limited to typical or lexical meanings, and analyzed into meanings and concepts which coincide with the technical idea of the present invention under the principle that the inventor can properly define the concepts of the terms in order to describe the invention through the best method.

Therefore, the embodiments described in this specification and the structures illustrated in the drawings are only examples, and may include all of variations, equivalents, and substitutes within the scope of the present invention.

[First Embodiment]

A double clutch transmission (DCT) in accordance with a first embodiment of the present invention may include first and second input shafts 10a and 10b, first and second output shafts 20a and 20b, first to fourth gear trains 30a to 30d, first to fourth synchro devices 40a to 40d, and an output gear 50. The first and second input shafts 10a and 10b may selectively receive power from an engine E/G. The first and second output shafts 20a and 20b may output converted power. The first to fourth gear trains 30a to 30d may be installed between the input shafts and the output shafts so as to increase/decrease the number of rotations. The first to fourth synchro devices 40a to 40d may synchronize the operations of the input shafts, the output shafts, and the gear trains. The output gear 50 may output outputs of the output shafts to a differential device Diff.

In particular, the DCT in accordance with the first embodiment of the present invention can provide eight forward speeds and one reverse speed using the four gear trains and the four synchro devices, that is, the first to fourth synchro devices 40a to 40d.

Hereafter, the structure of the DCT will be described in more detail as follows.

The first and second input shafts 10a and 10b may be connected to the engine E/G so as to receive power. At this time, the power may be selectively transmitted or interrupted by clutches C1 and C2. FIG. 1 illustrates an example in which power is transmitted to the first input shaft 10a through one clutch C1 or transmitted to the second input shaft 10b through the other clutch C2.

In particular, the first and second input shafts 10a and 10b may be arranged in parallel to each other such that the power can be stably transmitted. In the present embodiment, the first and second input shafts 10a and 10b may be installed in the form of typical double pipes on the coaxial line, thereby minimizing the installation space.

The output shaft 20 may include the first and second output shafts 20a and 20b which are installed in parallel to the above-described input shafts. The output shaft 20 may selectively receive power from the first input shaft 10a or the second input shaft 10b through the gear trains and the synchro devices which will be described below.

The first gear train 30a and the second gear train 30b may selectively output the power of the first input shaft 10a to the first and second output shafts 20a and 20b, respectively. The first and second gear trains 30a and 30b may include a first gear 31 which is rotated with the first input shaft 10a, and second and third gears 32 and 33 which are mounted on the first and second output shafts 20a and 20b, respectively, and engaged and rotated with the first gear 31.

In particular, the second and third gears 32 and 33 may be installed so as to face the first and second gear trains 30a and 30b, and selectively synchronized by the first and second synchro devices 40a and 40b so as to transmit power to the first output shaft 20a or the second output shaft 20b.

Furthermore, the speed stage of the first and second gear trains 30a and 30b may be determined according to the rear ratio of gears thereof. That is, the number of rotations based on the speed stage may be determined by the gear ratio. In the present embodiment, the gear ratio of the first gear 31 to the second and third gears 32 and 33 may be used. The gear ratio of the first gear train 30a may be defined in such a manner that the fifth and eighth speed stages are performed through the first output shaft 20a and the seventh speed stage is performed through the second output shaft 20b. Furthermore, the gear ratio of the second gear train 30b may be defined in such a manner that the third speed stage is performed through the first output shaft 20a and the first and eighth speed stages are performed through the second output shaft 20b.

Since the third and fourth gear trains 30c and 30d have the same structure as the first and second gear trains 30a and 30b, the detailed descriptions thereof are omitted herein. However, since the third and fourth gear trains 30c and 30d have differences in mounting positions and speed stages from the first and second gear trains 30a and 30b, the following descriptions will be focused on the differences.

First, in the third and fourth gear trains 30c and 30d, the first gear 31 may be mounted on the second input shaft 10b, and the second and third gears 32 and 33 may be mounted on the first and second output shafts 20a and 20b, respectively, and engaged with the first gear 31.

The gear ratio of the third gear train 30c may be defined in such a manner that the fourth speed stage is performed through the first output shaft 20a and the sixth and seventh speed stages are performed through the second output shaft 20b. Furthermore, the gear ratio of the fourth gear train 30d may be defined in such a manner that the reverse speed stage is performed through the first and second output shafts 20a and 20b and the first and second speed stages are performed through the second output shaft 20b.

In the embodiment of the present invention, the first to fourth gear trains 30a to 30d may be implemented with external gears such that power can be transmitted between the input shaft and the output shaft which are arranged in parallel to each other.

The first to fourth synchro devices 40a to 40d, which are a kind of clutch, may be mounted on the output shaft 20, and control the first to fourth gear trains 30a to 30d to selectively transmit power from the input shaft to the output shaft. Such synchro devices can be manufactured through a typical technology. In the present embodiment, the installation positions and operations thereof will be briefly described as follows.

First, the first synchro device 40a and the third synchro device 40c may be mounted on the first output shaft 20a. At this time, the first synchro device 40a may be installed between the first and second gear trains 30a and 30b, and the third synchro device 40c may be installed between the third and fourth gear trains 30c and 30d.

Furthermore, the second synchro device 40b and the fourth synchro device 40d may be mounted on the second output shaft 20b. The second synchro device 40b may be installed between the first and second gear trains 30a and 30b, and the fourth synchro device 40d may be installed between the third and fourth gear trains 30c and 30d.

The synchro devices mounted in such a manner may be operated with the above-described clutches C1 and C2 as depicted in Table 2 below, and restrict and release a selected gear train so as to change a speed stage.

TABLE 2

| | Clutch | | First synchro | | Second synchro | | Third synchro | | Fourth synchro | |
|---|---|---|---|---|---|---|---|---|---|---|
| | C1 | C2 | First train | Second train | First train | Second train | Third train | Fourth train | Third train | Fourth train |
| R | | o | | | | | | | • | |
| N | | | | | | | (•) | | | • |
| 1 | o | | | | • | | | | | • |
| 2 | | o | | | | | | | | • |
| 3 | o | | | | | • | | | | |
| 4 | | o | | | | | • | | | |
| 5 | o | | • | | | | | | | |
| 6 | | o | | | | | | | • | |
| 7 | o | | | | | | | • | • | |
| 8 | | o | • | | | • | | | | |

(•) represents selectively restricting or releasing synchro device

The output gear 50 is a gear for outputting power according to the speed stage changed through the output shaft 20. The output gear 50 may be engaged with the differential device Diff. Since the output gear 50 and the differential device Diff can be manufactured through a typical technology, the detailed descriptions thereof are omitted herein.

The DCT in accordance with the first embodiment of the present invention may be synchronized with a desired speed stage through four gear trains and four synchro devices. Then, eight forward speeds and one reverse speed can be performed through the operation of the clutches C1 and C2. Furthermore, a parking gear in accordance with the embodiment of the present invention may be provided at the output shaft 20, but is not illustrated in FIG. 1.

[Second Embodiment]

Figure 2:
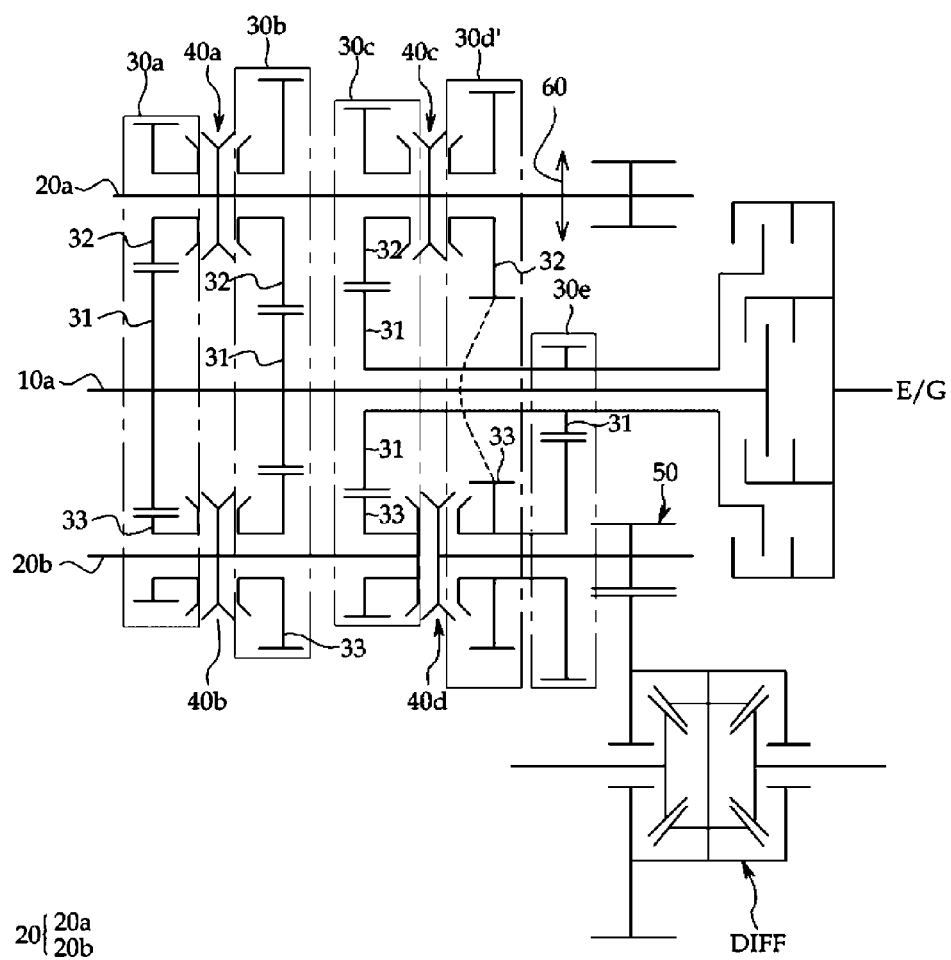
FIG. 2 schematically illustrates an example in which a DCT in accordance with a second embodiment of the present invention is applied.

As illustrated in FIG. 2, a DCT in accordance with a second embodiment of the present invention may include a fourth gear train 30d' implemented with dual gear trains. That is, the DCT may further include a fifth gear train 30e which is operated with the fourth gear train 30d'. In this case, the fourth gear train 30d' may be in charge of the second speed stage and the reverse speed stage, and the fifth gear train 30e may be operated integrally with the fourth gear train 30d'. Thus, after speed reduction is performed through the second output shaft 20b from the fifth gear train 30e, power may be transmitted to the first output shaft 20a through the fourth gear train 30d'.

In the second embodiment of the present invention, the DCT may include five gear trains such that the reverse speed stage can be performed through the dual gear trains.

In FIG. 2, reference numeral 60 represents a parking gear.

The invention claimed is:

1. A double clutch transmission (DCT) which provides eight forward speeds and one reverse speed, comprising:

first and second input shafts 10a and 10b selectively receiving power from an engine E/G through a first clutch C1 and a second clutch C2, respectively;

an output shaft 20 including first and second output shafts 20a and 20b which receive power from the first and second input shafts 10a and 10b, respectively, and output the received power;

first and second gear trains 30a and 30b mounted on the first input shaft 10a and selectively transmitting power to the output shaft 20;

third and fourth gear trains 30c and 30d mounted on the second input shaft 10b and selectively transmitting power to the output shaft 20;

a first synchro device 40a installed on the first output shaft 20a so as to be positioned between the first and second gear trains 30a and 30b and synchronizing the first and second gear trains 30a and 30b to selectively transmit power, and a third synchro device 40c installed on the first output shaft 20a so as to be positioned between the third and fourth gear trains 30c and 30d and synchronizing the third and fourth gear trains 30c and 30d to selectively transmit power;

a second synchro device 40b installed on the second output shaft 20b so as to be positioned between the first and second gear trains 30a and 30b and synchronizing the first and second gear trains 30a and 30b to selectively transmit power, and a fourth synchro device 40d installed on the second output shaft 20b so as to be positioned between the third and fourth gear trains 30c and 30d and synchronizing the third and fourth gear trains 30c and 30d to selectively transmit power; and an output gear 50 installed on the output shaft 20 and transmitting an output thereof to a differential device Diff, wherein at least one forward speed is configured to be determined by selecting at least two gear trains from the first to fourth gear trains 30a to 30d, wherein the first and second input shafts 10a and 10b are provided in the form of dual pipes using hollow shafts and arranged on a coaxial line, wherein the first to fourth gear trains 30a to 30d comprise external gears, wherein a speed change to a reverse speed is realized as the second clutch C2 is operated, and the third synchro device 40c is engaged with the fourth gear train 30d;

wherein a speed change to a neutral speed is realized as the second synchro device 40b is engaged selectively with the second gear train 30b, and the fourth synchro device 40d is engaged with the fourth gear train 30d;

wherein a speed change to a first forward speed is realized as the first clutch C1 is operated, the second synchro device 40b is engaged with the second gear train 30b, and the fourth synchro device 40d is engaged with the fourth gear train 30d;

wherein a speed change to a second forward speed is realized as the second clutch C2 is operated, and the fourth synchro device 40d is engaged with the fourth gear train 30d, wherein a speed change to a third forward speed is realized as the first clutch C1 is operated, and the first synchro device 40a is engaged with the second gear train 30b;

wherein a speed change to a fourth forward speed is realized as the second clutch C2 is operated, and the third synchro device 40c is engaged with the third gear train 30c;

wherein a speed change to a fifth forward speed is realized as the first clutch C1 is operated, and the first synchro device 40a is engaged with the first gear train 30a;

wherein a speed change to a sixth forward speed is realized as the second clutch C2 is operated, and the fourth synchro device 40d is engaged with the third gear train 30c;

wherein a speed change to a seventh forward speed is realized as the first clutch C1 is operated, the second synchro device 40b is engaged with the first gear train 30a, and the fourth synchro device 40d is engaged with the third gear train 30c; and wherein a speed change to an eighth forward speed is realized as the second clutch C2 is operated, the first synchro device 40a is engaged with the first gear train 30a, and the second synchro device 40b is engaged with the second gear train 30b.

2. A DCT which provides eight forward speeds and one reverse speed, comprising:

first and second input shafts 10a and 10b selectively receiving power from an engine E/G through a first clutch C1 and a second clutch C2, respectively;

an output shaft 20 including first and second output shafts 20a and 20b which receive power from the first and second input shafts 10a and 10b, respectively, and output the received power;

first and second gear trains 30a and 30b mounted on the first input shaft 10a and selectively transmitting power to the output shaft 20;

third and fourth gear trains 30c and 30d mounted on the second input shaft 10b and selectively transmitting power to the output shaft 20;

a first synchro device 40a installed on the first output shaft 20a so as to be positioned between the first and second gear trains 30a and 30b and synchronizing the first and second gear trains 30a and 30b to selectively transmit power, and a third synchro device 40c installed on the first output shaft 20a so as to be positioned between the third and fourth gear trains 30c and 30d and synchronizing the third and fourth gear trains 30c and 30d to selectively transmit power;

a second synchro device 40b installed on the second output shaft 20b so as to be positioned between the first and second gear trains 30a and 30b and synchronizing the first and second gear trains 30a and 30b to selectively transmit power, and a fourth synchro device 40d installed on the second output shaft 20b so as to be positioned between the third and fourth gear trains 30c and 30d and synchronizing the third and fourth gear trains 30c and 30d to selectively transmit power; and an output gear 50 installed on the output shaft 20 and transmitting an output thereof to a differential device Diff, wherein the fourth gear train 30d comprises a fifth gear train 30e so as to operate as dual gear trains, wherein the first and second input shafts 10a and 10b are provided in the form of dual pipes using hollow shafts and arranged on a coaxial line, wherein the first to fourth gear trains 30*a* to 30*d* comprise external gears, wherein a speed change to a reverse speed is realized as the second clutch C2 is operated, and the third synchro device 40*c* is engaged with the fourth gear train 30*d*;

wherein a speed change to a neutral speed is realized as the second synchro device 40*b* is engaged selectively with the second gear train 30*b*, and the fourth synchro device 40*d* is engaged with the fourth gear train 30*d*;

wherein a speed change to a first forward speed is realized as the first clutch C1 is operated, the second synchro device 40*b* is engaged with the second gear train 30*b*, and the fourth synchro device 40*d* is engaged with the fourth gear train 30*d*;

wherein a speed change to a second forward speed is realized as the second clutch C2 is operated, and the fourth synchro device 40*d* is engaged with the fourth gear train 30*d*;

wherein a speed change to a third forward speed is realized as the first clutch C1 is operated, and the first synchro device 40*a* is engaged with the second gear train 30*b*;

wherein a speed change to a fourth forward speed is realized as the second clutch C2 is operated, and the third synchro device 40*c* is engaged with the third gear train 30*c*;

wherein a speed change to a fifth forward speed is realized as the first clutch C1 is operated, and the first synchro device 40*a* is engaged with the first gear train 30*a*;

wherein a speed change to a sixth forward speed is realized as the second clutch C2 is operated, and the fourth synchro device 40*d* is engaged with the third gear train 30*c*;

wherein a speed change to a seventh forward speed is realized as the first clutch C1 is operated, the second synchro device 40*b* is engaged with the first gear train 30*a*, and the fourth synchro device 40*d* is engaged with the third gear train 30*c*; and wherein a speed change to a eighth forward speed is realized as the second clutch C2 is operated, the first synchro device 40*a* is engaged with the first gear train 30*a*, and the second synchro device 40*b* is engaged with the second gear train 30*b*.

* * * * *